United States Patent
Nakazawa et al.

(10) Patent No.: US 11,861,879 B2
(45) Date of Patent: Jan. 2, 2024

(54) INFORMATION PROCESSING DEVICE, INFORMATION PROCESSING METHOD, AND STORAGE MEDIUM

(71) Applicant: RAKUTEN GROUP, INC., Tokyo (JP)

(72) Inventors: Mitsuru Nakazawa, Tokyo (JP); Takashi Tomooka, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 289 days.

(21) Appl. No.: 17/356,474

(22) Filed: Jun. 23, 2021

(65) Prior Publication Data

US 2022/0101038 A1 Mar. 31, 2022

(30) Foreign Application Priority Data

Sep. 28, 2020 (JP) ................................. 2020-161820

(51) Int. Cl.
*G06T 7/73* (2017.01)
*G06V 10/75* (2022.01)
*G06F 16/538* (2019.01)
*G06F 18/22* (2023.01)

(52) U.S. Cl.
CPC .......... *G06V 10/751* (2022.01); *G06F 16/538* (2019.01); *G06F 18/22* (2023.01); *G06T 7/73* (2017.01)

(58) Field of Classification Search
CPC .......... G06F 16/538; G06F 18/22; G06T 7/73; G06V 10/751
See application file for complete search history.

(56) References Cited

U.S. PATENT DOCUMENTS

| 11,076,087 B2 * | 7/2021 | Kim ........................ H04N 23/64 |
| 11,347,739 B2 * | 5/2022 | Hamada ................ G06F 16/285 |
| 11,663,721 B1 * | 5/2023 | Graves .................. G06V 40/161 |
| | | 382/128 |
| 2015/0146989 A1 * | 5/2015 | Shiiyama ............. G06V 10/462 |
| | | 382/197 |
| 2016/0012564 A1 * | 1/2016 | Ma ........................ G06T 1/0021 |
| | | 382/100 |

(Continued)

FOREIGN PATENT DOCUMENTS

| CN | 108197557 A | 6/2018 |
| JP | 2013122630 A | 6/2013 |

(Continued)

OTHER PUBLICATIONS

Office Action dated Apr. 22, 2022, for corresponding TW Patent Application No. 110122598 partial English translation pp. 1-10.

(Continued)

*Primary Examiner* — Shaghayegh Azima
(74) *Attorney, Agent, or Firm* — HEA LAW PLLC

(57) ABSTRACT

An information processing device is configured to identify a background area of a first image registered from a first account and a background area of a second image registered from a second account, and to output identicalness information indicating whether a user owning the first account and a user owning the second account are identical to each other based on the background area of the first image and the background area of the second image.

6 Claims, 14 Drawing Sheets

(56) References Cited

U.S. PATENT DOCUMENTS

| | | | | |
|---|---|---|---|---|
| 2016/0148053 A1* | 5/2016 | Matsuzaki | ............... | G06T 7/246 382/128 |
| 2016/0232428 A1* | 8/2016 | Engström | ........... | G06F 16/5838 |
| 2017/0078281 A1 | 3/2017 | Lu et al. | | |
| 2019/0095600 A1* | 3/2019 | Chan | ..................... | G06F 21/316 |
| 2020/0218772 A1* | 7/2020 | Zhang | .................... | G06V 20/30 |
| 2021/0073943 A1* | 3/2021 | Park | ........................ | G06F 18/22 |
| 2021/0279475 A1* | 9/2021 | Tusch | ................. | H04L 63/0861 |

FOREIGN PATENT DOCUMENTS

| | | | |
|---|---|---|---|
| JP | 2015111339 A | 6/2015 | |
| JP | 2017151574 A | 8/2017 | |
| JP | 2020526835 A | 8/2020 | |
| TW | 201710938 A | 3/2017 | |
| WO | 2019234827 A1 | 12/2019 | |
| WO | WO-2020237942 A1 * | 12/2020 | ......... G06K 9/00362 |

OTHER PUBLICATIONS

Office Action dated Nov. 24, 2021, for corresponding JP Patent Application No. 2020-161820 with partial English translation pp. 1-4.

* cited by examiner

INFORMATION PROCESSING DEVICE, INFORMATION PROCESSING METHOD, AND STORAGE MEDIUM

CROSS-REFERENCE TO RELATED APPLICATION

The present application claims priority from Japanese application JP 2020-161820 filed on Sep. 28, 2020, the content of which is hereby incorporated by reference into this application.

FIELD OF THE INVENTION

The present invention relates to an information processing device, an information processing method, and a storage medium.

BACKGROUND OF THE INVENTION

Various services are provided online. Users create their accounts in order to use the services, and use the services through use of the created accounts. General users each create one account for one service, but some users may each create a plurality of accounts for one service. In order to grasp how the accounts are being used, a service operator performs processing for detecting a plurality of accounts created by an identical user.

In JP2013-122630A, there is disclosed a technology for calculating a matching degree through use of profile information on a plurality of accounts and determining whether or not users of the accounts are an identical person based on the calculated matching degree. In addition, in WO 2019/234827 A1, there is disclosed a technology for identifying accounts owned by an identical user based on profile information on accounts and positional information identified by, for example, geo-tags posted by the users of the accounts. In addition, in JP2017-151574A, there is disclosed a technology for comparing pieces of information posted by users on social media and identifying an identical user based on the match or similarity of, for example, frequently used words or phrases in posts, input habits, and posted content.

With the related-art methods, it may not be possible to detect a plurality of accounts created by an identical user. For example, when a user registers a plurality of accounts through use of different kinds of profile information and positional information, or when a service hardly reflects the user's characteristics in posted text, it is difficult to detect a plurality of accounts created by an identical user.

SUMMARY OF THE INVENTION

The present invention has been made in view of the above-mentioned problem, and an object thereof is to provide a technology for detecting a plurality of accounts created by an identical user even when the detection is difficult by a related-art method.

In order to solve the above-mentioned problem, according to at least one embodiment of the present invention, there is provided an information processing device including: a background identification module configured to identify a background area of a first image registered from a first account and a background area of a second image registered from a second account; and an information output module configured to output identicalness information indicating whether a user owning the first account and a user owning the second account are identical to each other based on the background area of the first image and the background area of the second image.

Further, according to at least one embodiment of the present invention, there is provided an information processing method including: identifying a background area of a first image registered from a first account and a background area of a second image registered from a second account; and outputting identicalness information indicating whether a user owning the first account and a user owning the second account are identical to each other based on the background area of the first image and the background area of the second image.

Further, according to at least one embodiment of the present invention, there is provided a program for causing a computer to function as: a background identification module configured to identify a background area of a first image registered from a first account and a background area of a second image registered from a second account; and an information output module configured to output identicalness information indicating whether a user owning the first account and a user owning the second account are identical to each other based on the background area of the first image and the background area of the second image.

In at least one embodiment of the present invention, the information output module may be configured to: acquire a plurality of first local feature vectors each indicating a local feature of the first image; acquire a plurality of second local feature vectors each indicating a local feature of the second image; and output the identicalness information based on results of searching for the second local feature vectors that correspond to the plurality of first local feature vectors, respectively. In at least one embodiment of the present invention, the background identification module may be configured to identify the background area of the first image and the background area of each of a plurality of second images, the information output module may be configured to select a plurality of candidate images each having the background area similar to the background area of the first image from among the plurality of second images based on a first global feature vector extracted from the first image and a plurality of second global feature vectors extracted from the plurality of second images, respectively, and the information output module may be configured to: acquire the plurality of first local feature vectors, each indicating the local feature of the first image and the plurality of second local feature vectors, each indicating the local feature of any one of the plurality of candidate images; and output the identicalness information indicating whether the user owning the first account and the user owning the second account are identical to each other.

In at least one embodiment of the present invention, the information output module may be configured to: estimate a three-dimensional positions for each of a plurality of points, at which at least a part of the plurality of first local feature vectors are extracted, based on positions at which at least a part of the plurality of first local feature vectors have been extracted in the first image and positions at which the second local feature vectors corresponding to the plurality of first local feature vectors, respectively, have been extracted in the second image; and output the identicalness information based on the estimated three-dimensional positions of the plurality of points.

In at least one embodiment of the present invention, the background identification module may be configured to identify a background area of at least one first image and a background area of each of a plurality of second images, and the information output module may be configured to: search for at least one of second images corresponding to the at least one first image based on the background area of the at least one first image and the background areas of the plurality of second images; and output the identicalness information based on the at least one of second images corresponding to the at least one first image.

In at least one embodiment of the present invention, the identicalness information may be a result of determination of whether the user owning the first account and the user owning the second account are identical to each other.

In at least one embodiment of the present invention, the identicalness information may indicate a magnitude of a probability that the user owning the first account and the user owning the second account are identical to each other.

According to at least one embodiment of the present invention, it is possible to detect a plurality of accounts created by the identical user even when the detection is difficult by a related-art method.

DETAILED DESCRIPTION OF THE INVENTION

Now, at least one embodiment of the present invention is described with reference to the accompanying drawings. Duplicate descriptions are omitted for each component denoted by the same reference symbol. In this embodiment, there is described an information processing system configured to provide a service in which a plurality of accounts are created by a plurality of users, posts of a plurality of images are received from each of the plurality of accounts, and the images are made public to users who access the images from other accounts.

Figure 1:
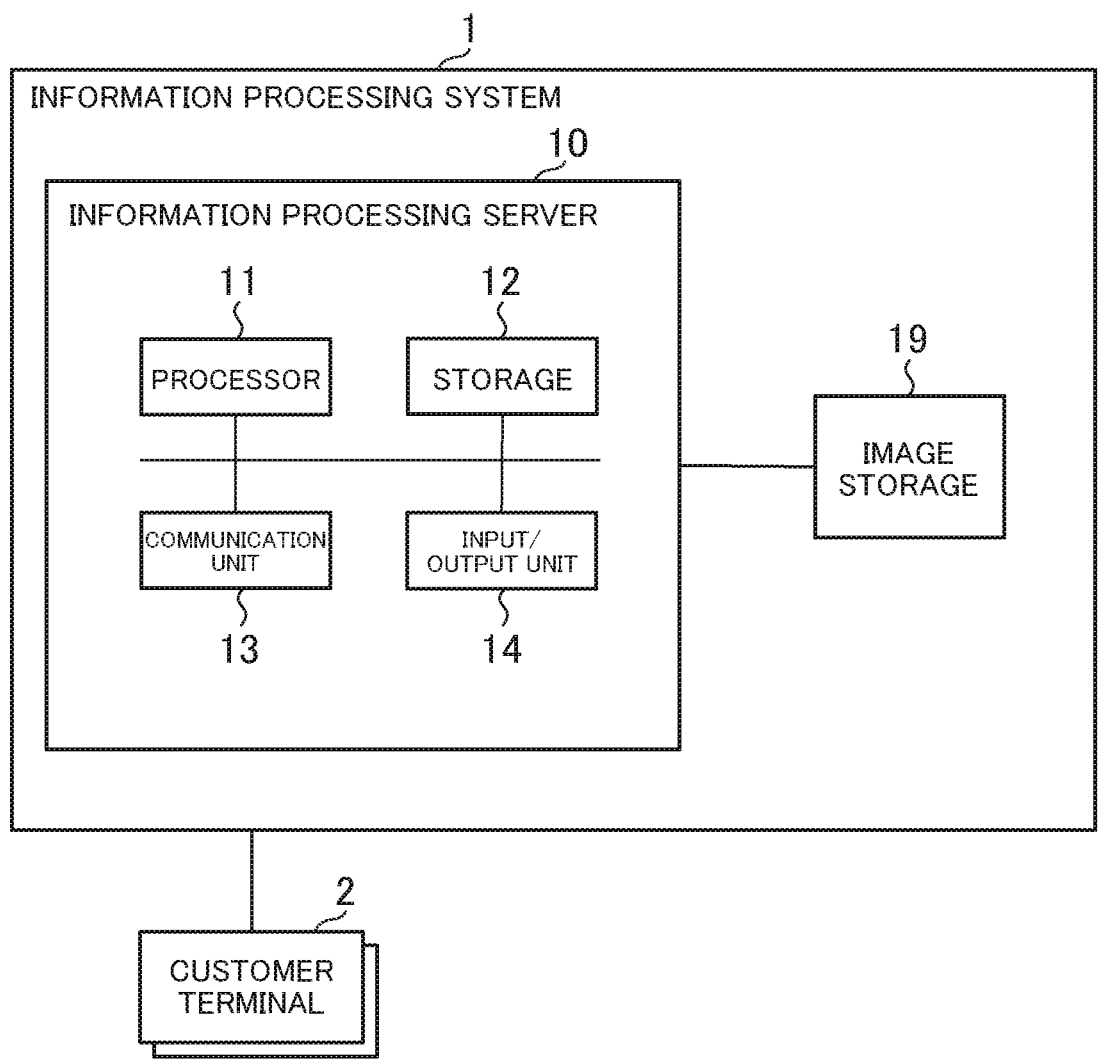
FIG. 1 is a diagram for illustrating an example of an information processing system according to at least one embodiment of the present invention.

FIG. 1 is a diagram for illustrating an example of an information processing system 1 according to at least one embodiment of the present invention. The information processing system 1 includes an information processing server 10 and an image storage 19. The information processing server 10 is configured to communicate with at least one of customer terminals 2 and register, in the service, an image transmitted by a user operating each customer terminal 2. Specifically, the information processing system 1 stores an image received from the user in the image storage 19, and registers the image in a searchable manner.

The information processing server 10 includes a processor 11, a storage 12, a communication unit 13, and an input/output unit 14. The information processing system 1 may be implemented by a plurality of server computers configured to execute processing of the information processing server 10.

The processor 11 is configured to operate in accordance with a program stored in the storage 12. The processor 11 is also configured to control the communication unit 13 and the input/output unit 14. The above-mentioned program may be provided through, for example, the Internet, or may be provided by being stored and provided in a flash memory, a DVD-ROM, or another computer-readable storage medium.

The storage 12 is formed of memory devices, such as a RAM and a flash memory, and an external storage device, such as a hard disk drive. The storage 12 is configured to store the above-mentioned program. The storage 12 is also configured to store information and calculation results that are input from the processor 11, the communication unit 13, and the input/output unit 14.

The communication unit 13 implements a function of communicating with another device, and is formed of, for example, an integrated circuit for a wireless LAN or a wired LAN. Under control of the processor 11, the communication unit 13 inputs information received from another device to the processor 11 and the storage 12, and transmits information to another device.

The input/output unit 14 is formed of, for example, a video controller configured to control a display output device and a controller configured to acquire data from an input device. Examples of the input device include a keyboard, a mouse, and a touch panel. The input/output unit 14 is configured to output display data to the display output device under the control of the processor 11, and to acquire data input by the user operating the input device. The display output device is, for example, a display device connected to the outside.

The image storage 19 is formed of, for example, an external storage device, such as a hard disk drive, or a flash memory. The image storage 19 is configured to store an image registered by the user under control of the information processing server 10. The image storage 19 follows instructions of the information processing server 10 to receive an image from the information processing server 10, store the image, and transmit a read-out image to the information processing server 10. The image storage 19 is a device different from the information processing server 10, but may be a part of the storage 12 of the information processing server 10.

Figure 2:
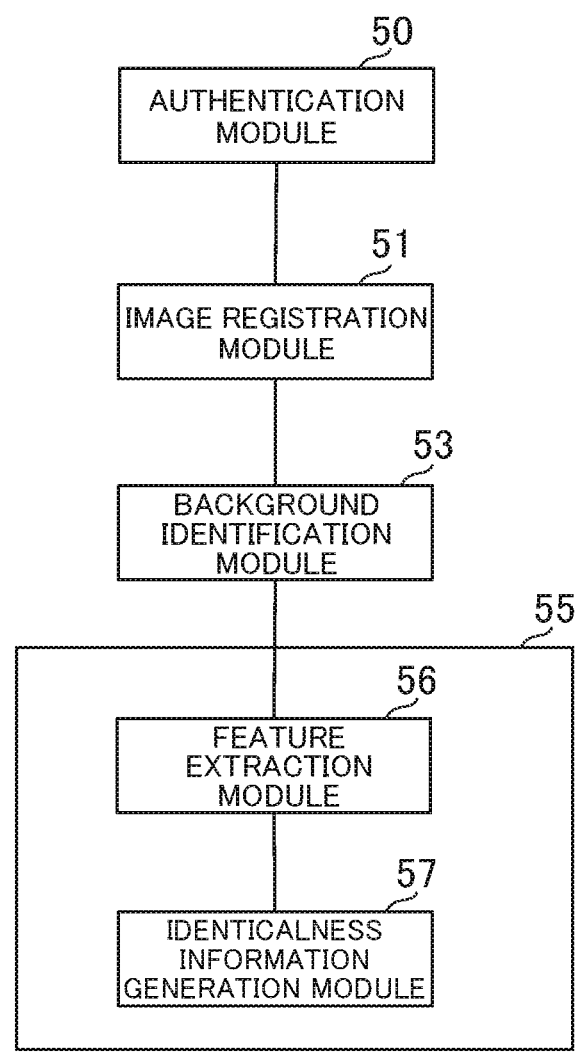
FIG. 2 is a block diagram for illustrating functions implemented by the information processing system.

Next, functions provided by the information processing system 1 are described. FIG. 2 is a block diagram for illustrating functions implemented by the information processing system 1. The information processing system 1 includes an authentication module 50, an image registration module 51, a background identification module 53, and an identicalness information output module 55. In addition, the identicalness information output module 55 functionally includes a feature extraction module 56 and an identicalness information generation module 57. Those functions are implemented when the processor 11 included in the information processing server 10 executes the programs stored in the storage 12 and controls the communication unit 13 and other components.

The authentication module 50 is configured to authenticate an account of a user who accesses the information processing system 1. More specifically, the authentication module 50 acquires information required for authentication including the account from the customer terminal 2 operated by the user, and authenticates whether or not the account is a proper one. After the account has been authenticated, the subsequent communication between the customer terminal 2 and the information processing server 10 is associated with the account. It is assumed that the user has created an account with respect to the information processing system 1 in advance.

The image registration module 51 is configured to acquire an image from a user who accesses the information processing system 1 from a certain account, and store the acquired image in the image storage 19 in association with the account.

The background identification module 53 is configured to identify a background area of the image registered from the account.

The identicalness information output module 55 is configured to output identicalness information, which indicates whether or not a user owning a first account serving as a query and a user owning a second account being another account are identical, based on a background area of a first image associated with the first account and a background area of the second image associated with the second account.

The feature extraction module 56 is configured to acquire, from each of the registered images, one global feature vector indicating a global feature of the background area of the image and a plurality of local feature vectors indicating local features of the image.

The identicalness information generation module 57 is configured to output the identicalness information based on a first global feature vector acquired for the first image and a second global feature vector acquired for the second image. The identicalness information generation module 57 is also configured to output the identicalness information based on a plurality of first local feature vectors acquired for the first image and a plurality of second local feature vectors acquired for the second image. The identicalness information generation module 57 is also configured to search for at least one of second images corresponding to the first image based on the background area of at least one first image and the background areas of a plurality of second images, and to output the identicalness information based on the at least one of second images corresponding to the at least one first image.

Figure 3:
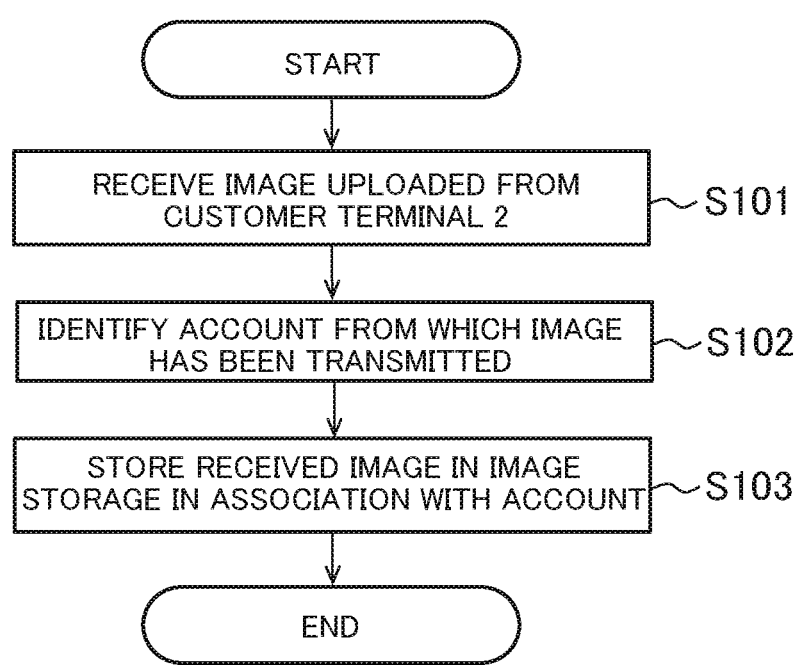
FIG. 3 is a flow chart for illustrating an example of processing of an image registration module.

FIG. 3 is a flow chart for illustrating an example of processing of the image registration module 51. First, the image registration module 51 receives an image uploaded from the customer terminal 2 (Step S101). The image registration module identifies an account from which the image has been transmitted (Step S102). In this case, the image registration module 51 may identify the account from which the image has been transmitted based on the account associated with the communication from the customer terminal 2, or may identify the account from which the image has been transmitted based on information transmitted together with the image. The image registration module 51 stores the received image in the image storage 19 in association with the identified account (Step S103).

Figure 4:
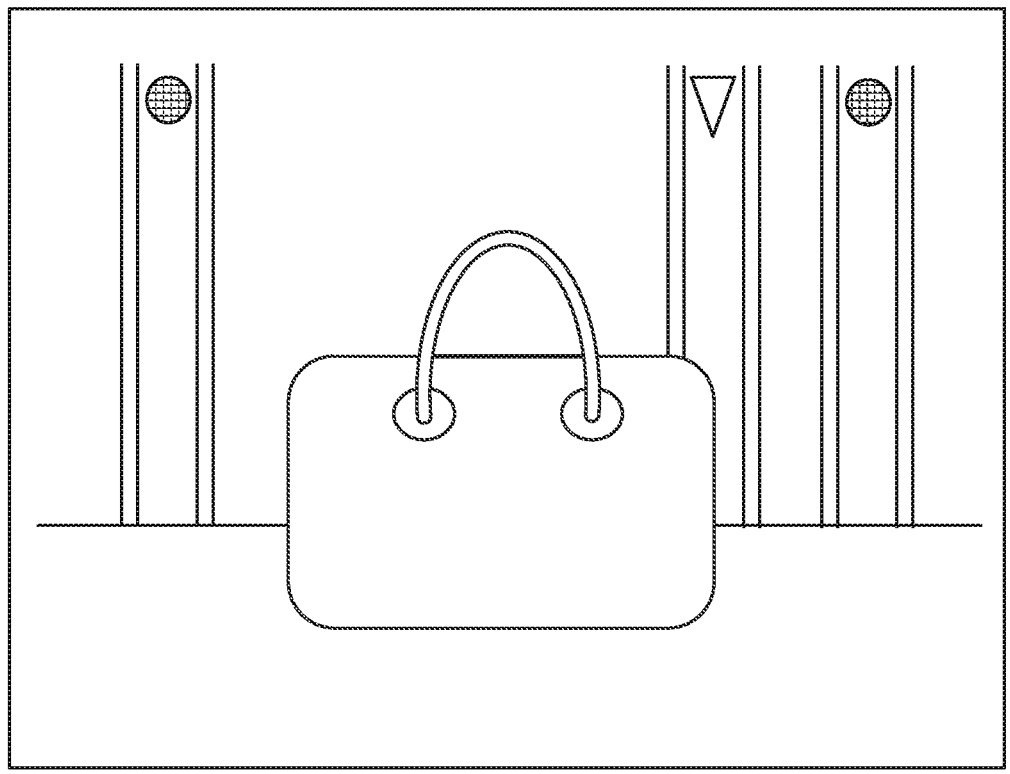
FIG. 4 is a view for illustrating an example of an image to be registered.

FIG. 4 is a view for illustrating an example of an image to be registered. FIG. 4 is an example of an image to be registered in a marketplace service that allows customers to directly buy and sell products therebetween, and is an illustration of an image of a bag placed in a room.

Figure 5:
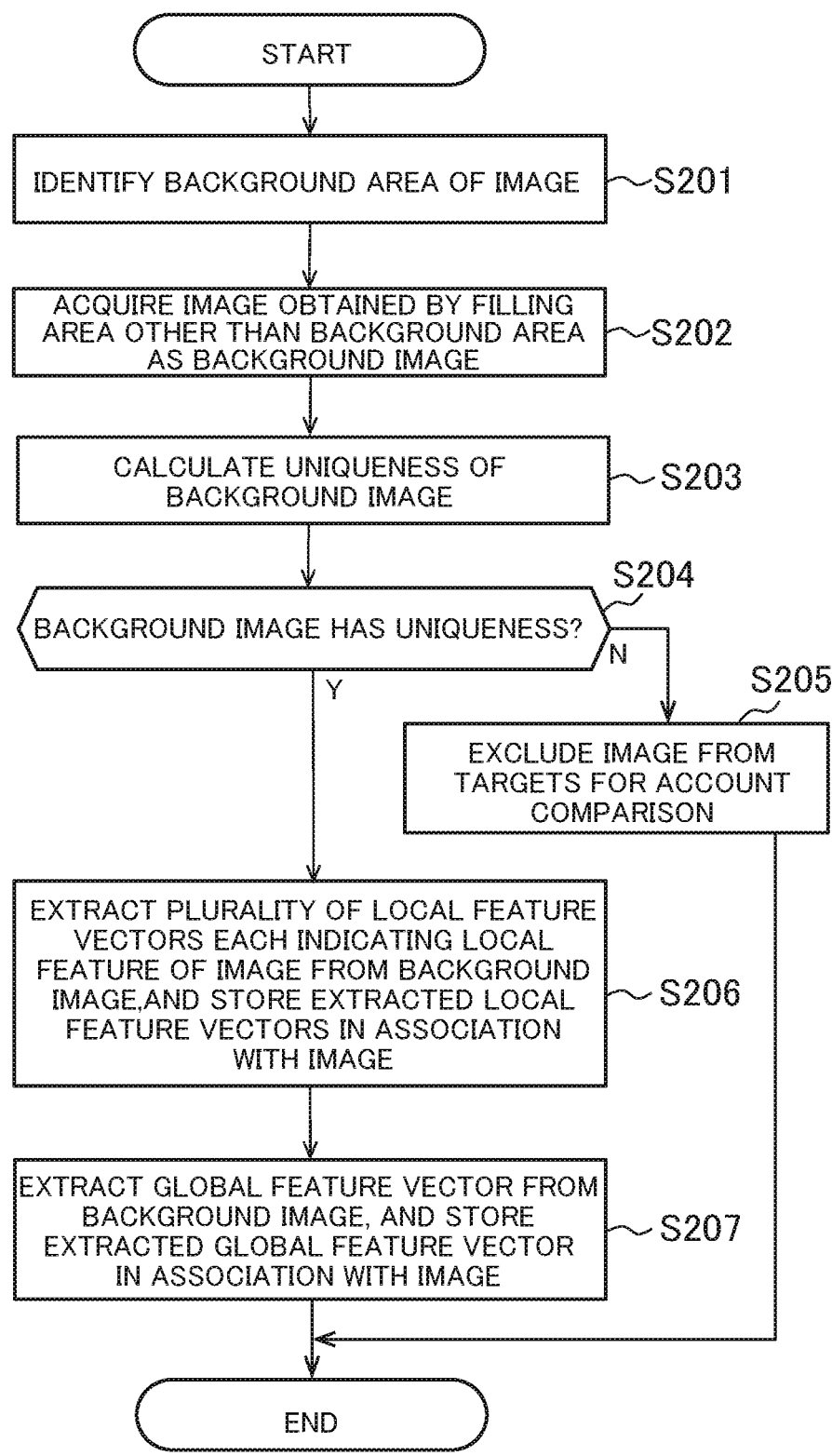
FIG. 5 is a flow chart for illustrating an example of processing of a background identification module and a feature extraction module.

Next, processing for detecting a plurality of accounts owned by an identical user is described. FIG. 5 is a flow chart for illustrating an example of processing of the background identification module 53 and the feature extraction module 56. The processing illustrated in FIG. 5 is executed for each image. In addition, the processing illustrated in FIG. 5 may be performed each time the image registration module 51 receives an image to be registered. In another case, images for which the processing illustrated in FIG. 5 has not been executed may be periodically detected, and the processing illustrated in FIG. 5 may be executed for each of the detected images.

First, the background identification module 53 identifies the background area of the image to be processed (Step S201). The background area may be identified by so-called semantic segmentation using a neural network, or may be identified by a so-called region proposal method using a neural network. Those methods are publicly known, and hence detailed descriptions thereof are omitted.

When the background area is identified, the background identification module 53 acquires an image obtained by filling an area (namely, foreground) other than the background area as an image (background image) of the background area of the image to be processed (Step S202).

Figure 6:
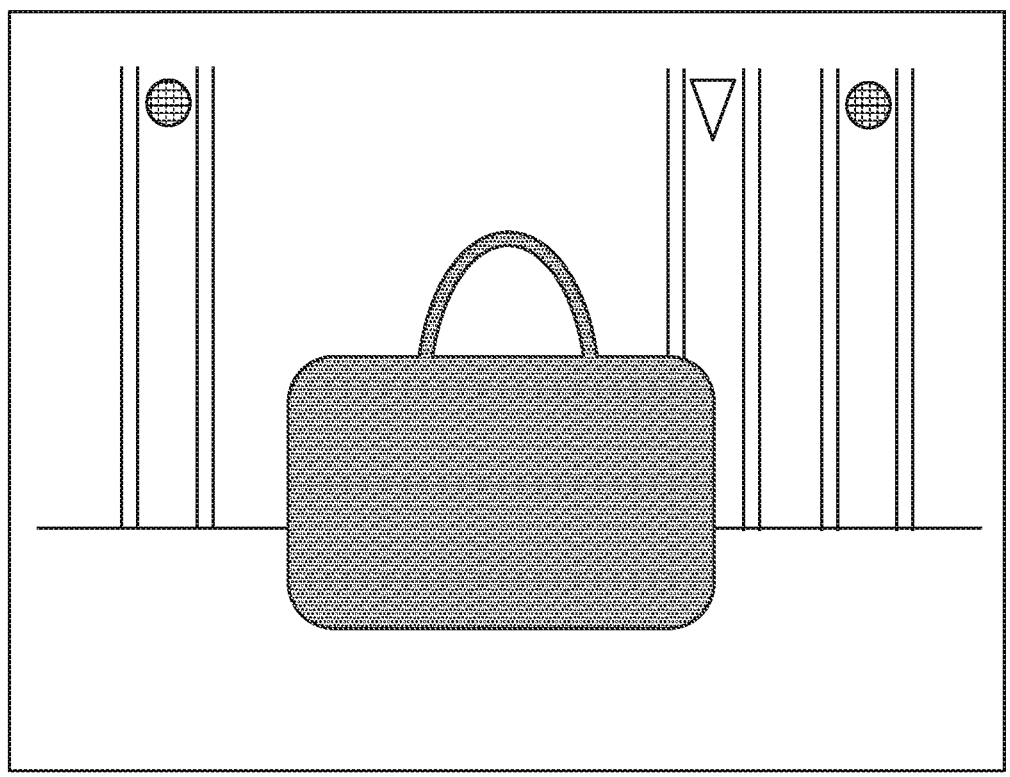
FIG. 6 is a view for illustrating an example of a background image.

FIG. 6 is a view for illustrating an example of the background image. In the background image, an area of a bag, which is the foreground, is filled. In the following processing, the filled area is treated as an area including no image, and is excluded from extraction targets of the global feature vector and the local feature vector.

When the background image is acquired, the feature extraction module 56 calculates uniqueness of the background image (Step S203). The uniqueness of the background image may be calculated by the feature extraction module 56 inputting the background image into a machine learning model and acquiring output of the machine learning model as a calculation result. In this embodiment, the machine learning model is a machine learning model implemented with machine learning, for example, AdaBoost, a random forest, a neural network, a support vector machine (SVM), or a nearest neighbor discriminator.

The machine learning model is subjected to learning based on training data including learning input images and label data in advance. The training data includes: a learning input image obtained by enlarging or reducing the background image so that the background image has a predetermined number of pixels; and given label data indicating a level of the uniqueness of the background image.

The uniqueness may be calculated without use of the machine learning model. For example, the level of the uniqueness may be calculated by obtaining a variance of a gradation value of the background image. In this case, as the background is closer to a single color, a variance value becomes smaller, and the uniqueness becomes lower. It is difficult to detect an ordinary pattern of, for example, a lattice, but it is possible to calculate the uniqueness at high speed.

In another case, the uniqueness may be calculated based on background images similar to the background image for which the uniqueness is to be calculated. More specifically, an image search model including a plurality of background images that have already been acquired is built in advance. Then, the feature extraction module 56 searches for background images similar to the background image for which the uniqueness is to be calculated through use of the image search model. The feature extraction module 56 calculates the uniqueness based on the number of similar background images found through the search or a similarity between each of the similar background images and the background image for which the uniqueness is to be calculated. As the number of similar background images that have been found becomes smaller, or the similarity becomes smaller, the uniqueness becomes higher.

When the background image has no uniqueness (the level of the uniqueness is lower than a determination threshold value) (N in Step S204), the feature extraction module 56 excludes the image from which this background image has been extracted from targets to be subjected to determination of accounts owned by an identical user, which is described below (Step S205), and the processing from Step S206 to Step S208 is not executed.

The processing from Step S203 to Step S205 is performed in order to exclude an ordinary (low in uniqueness) background image from processing targets. The ordinary background image is highly likely to be included in images of different users, and hence it is not appropriate to use the ordinary background image to detect a plurality of accounts owned by an identical user. Accordingly, those processing steps can improve accuracy in detection of a plurality of accounts owned by an identical user, and can save calculation resources by skipping the processing relating to the ordinary background image.

In this case, when the background image has uniqueness (the level of the uniqueness exceeds the determination threshold value) (Y in Step S204), the feature extraction module 56 extracts a plurality of local feature vectors from the background image, and stores the extracted local feature vectors in association with the original image of the background image (Step S206). The local feature vectors may be stored in the image storage 19, or may be stored in the storage 12. Each of the plurality of local feature vectors indicates a local feature of the background image. The feature extraction module 56 may extract the local feature vectors through use of a publicly known method, for example, SIFT, ORB, or BRISK.

Figure 7:
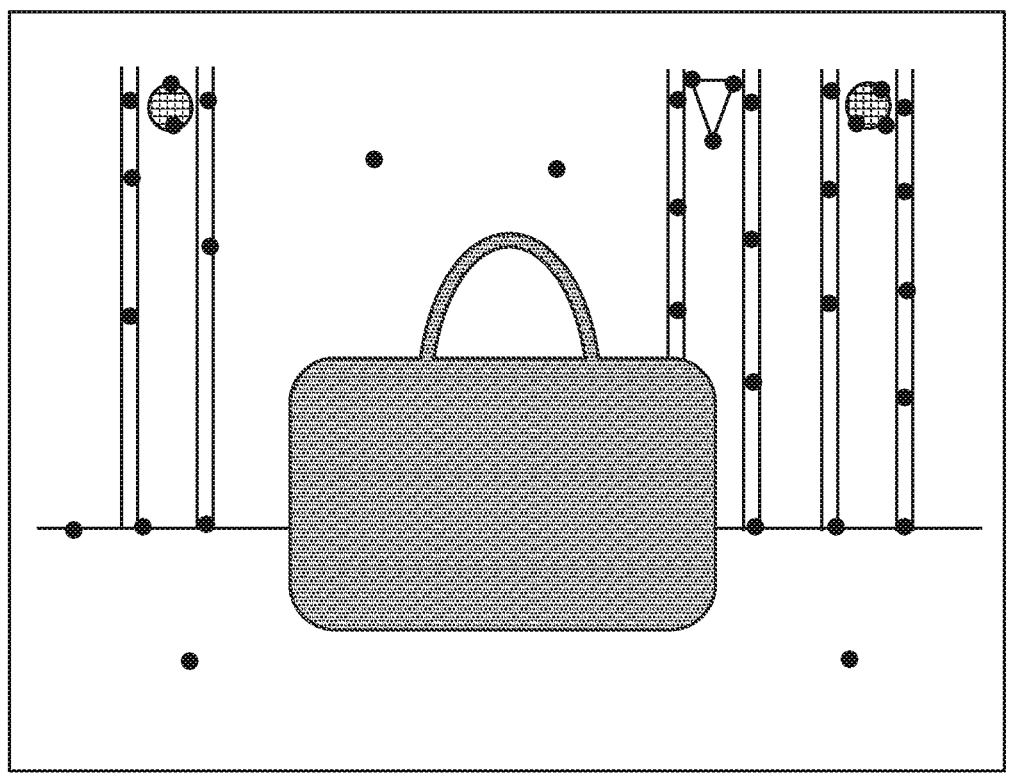
FIG. 7 is a view for schematically illustrating extraction of local feature vectors.

The feature extraction module 56 also acquires a position of a point at which the local feature vector is extracted in the image together with the local feature vector, and stores the position of the point as well in association with the image. FIG. 7 is a view for schematically illustrating the extraction of the local feature vectors. In FIG. 7, the black circles indicate the points at which the local feature vectors are extracted from the background image illustrated in FIG. 6. The local feature vectors are extracted from the points exhibiting the local features in the background image, and the number of local feature vectors varies depending on the background image. In the following description, local feature vectors extracted from a background image generated from a certain image are referred to as "local feature vectors of the image."

The feature extraction module 56 also extracts information other than the local feature vectors. More specifically, the feature extraction module 56 extracts a global feature vector from the background image, and stores the extracted global feature vector in association with the original image of the background image (Step S207). In this case, the feature extraction module 56 extracts one global feature vector from one background image. In the following description, a global feature vector extracted from a background image generated from a certain image is referred to as "global feature vector of the image."

The feature extraction module 56 may extract the global feature vector through use of the method of "Bag of Visual Words (BoVW)." In this case, the feature extraction module 56 may determine Visual Words based on background images having uniqueness among the background images relating to all accounts and extract the global feature vector of each of the background images, or may determine Visual Words based on some of the background images. The processing method of BoVW is publicly known, and hence a detailed description of the processing is omitted. The feature extraction module 56 may extract the global feature vector based on the local feature vectors extracted in Step S206, or may extract the global feature vector based on local feature vectors extracted by a method different from that of Step S206. In another case, although the accuracy is lowered, the feature extraction module 56 may extract the global feature vector from an image in which the foreground is not filled.

In place of BoVW, the feature extraction module 56 may input a background image to an encoder portion of an autoencoder and acquire output of the encoder portion as the global feature vector. In this case, it is assumed that a plurality of training images are input to the autoencoder in advance and a parameter of each node of the autoencoder is adjusted based on the output of the autoencoder and the training images.

Now, the processing of the identicalness information generation module 57 is described. The identicalness information generation module 57 determines whether or not the first image and the second image have an identical background in order to determine a certain account (first account) and another account (second account) belong to an identical user. The first image is an image stored in association with the first account by the image registration module 51, and the second image is an image stored in association with the second account by the image registration module 51. However, the first image and the second image that are to be subjected to the following processing are limited to those determined to have uniqueness in the background image in Step S204.

Figure 8:
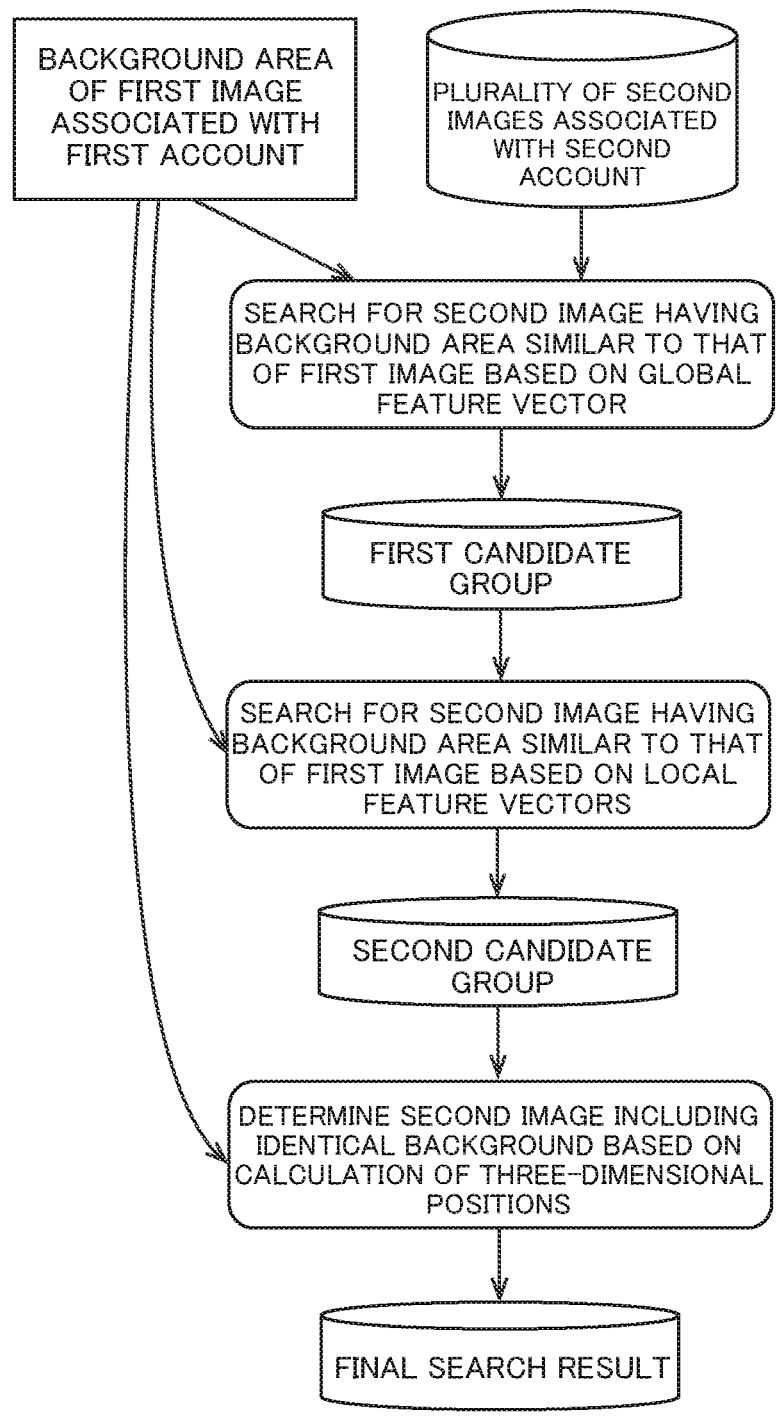
FIG. 8 is a diagram for illustrating an outline of processing of an identicalness information generation module.

FIG. 8 is a diagram for illustrating an outline of processing of the identicalness information generation module 57. To facilitate the description, FIG. 8 is an illustration of an exemplary case in which one first image associated with the first account is used as a query image to search a plurality of second images for a second image having a background in common with the first image. The processing illustrated in FIG. 8 may be executed on each of the first images associated with the first account.

The identicalness information generation module 57 executes three-stage processing in order to reduce a processing load and improve accuracy at the same time. In the first-stage processing, a group of second images (first candidate group) is generated by screening similar background images by a method having a low processing load. In the first-stage processing, a similar second image is detected based on the similarity between the global feature vector of the first image and the global feature vector of the second image. The detected second image is added to the first candidate group.

The background image of the first image and the background image of the second image correspond to the first image and the second image, respectively, on a one-to-one basis, and hence in the first-stage processing, the background image of the first image and the background image of the second image may be detected in place of the first image and the second image, respectively. The same applies to the following processing.

In the second-stage processing, a group of second images (second candidate group) having a smaller number than the first candidate group is generated by screening similar background images by a more accurate method. In the second-stage processing, a plurality of local feature vectors (first local feature vectors) of the first image and a plurality of local feature vectors (second local feature vectors) of the second image are caused to match each other by a publicly known matching method, and it may be determined whether they are similar to each other based on the number of sets of the first local feature vector and the second local feature vector that are considered to correspond to each other.

In the third-stage processing, the second images are screened based on whether or not a proper three-dimensional background can be obtained from sets of the first local feature vector and the second local feature vector corresponding to each other. More specifically, in the third-stage processing, from a plurality of sets, the three-dimensional positions of the points at which the first and second local feature vectors included in the sets are extracted are estimated, and it is determined whether a proper three-dimensional background has been obtained based on whether or not the three-dimensional positions have been properly estimated. This determination is performed for each of the second images included in the second candidate group. The second image determined to include an identical background is output as a final search result.

Figure 9:
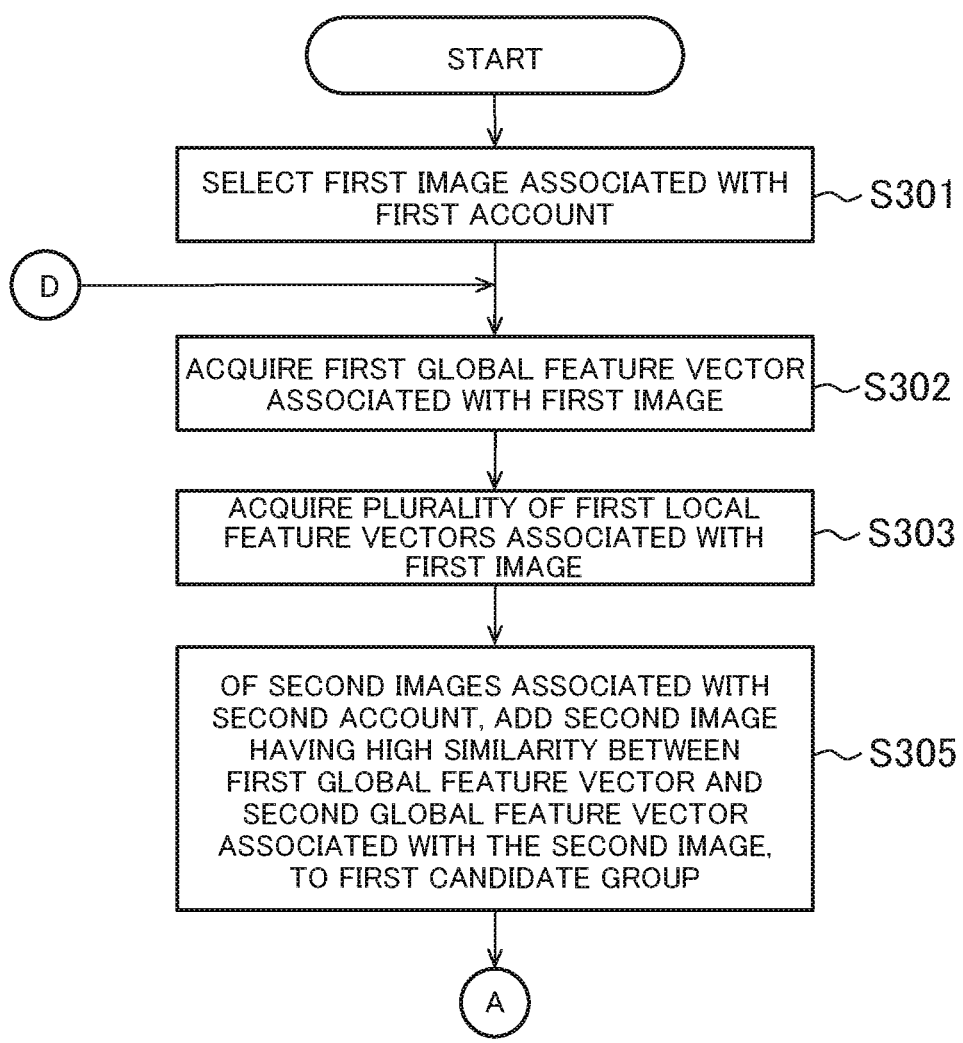
FIG. 9 is a flow chart for illustrating an example of the processing of the identicalness information generation module.
Figure 10:
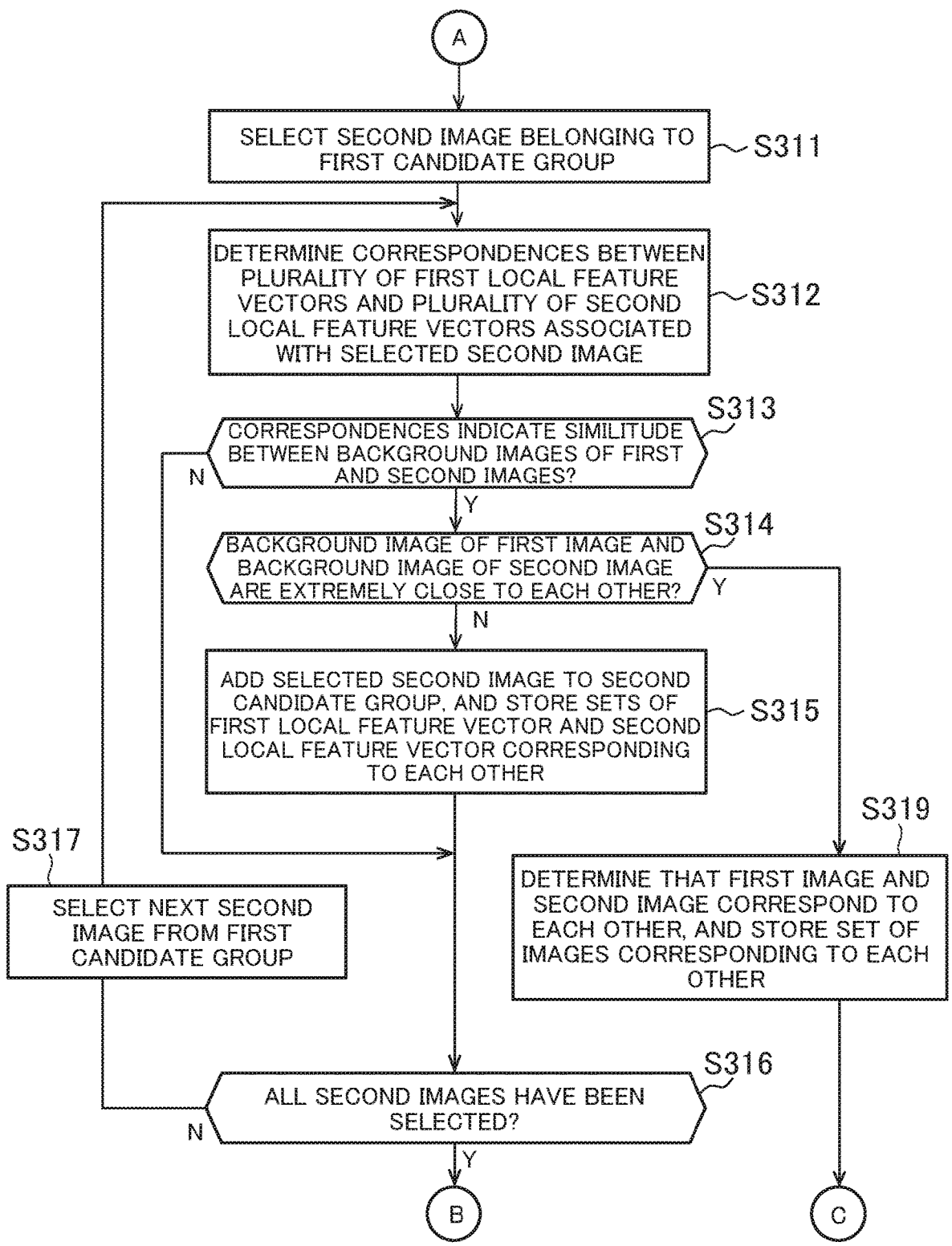
FIG. 10 is a flow chart for illustrating an example of processing of an identicalness information output module.
Figure 11:
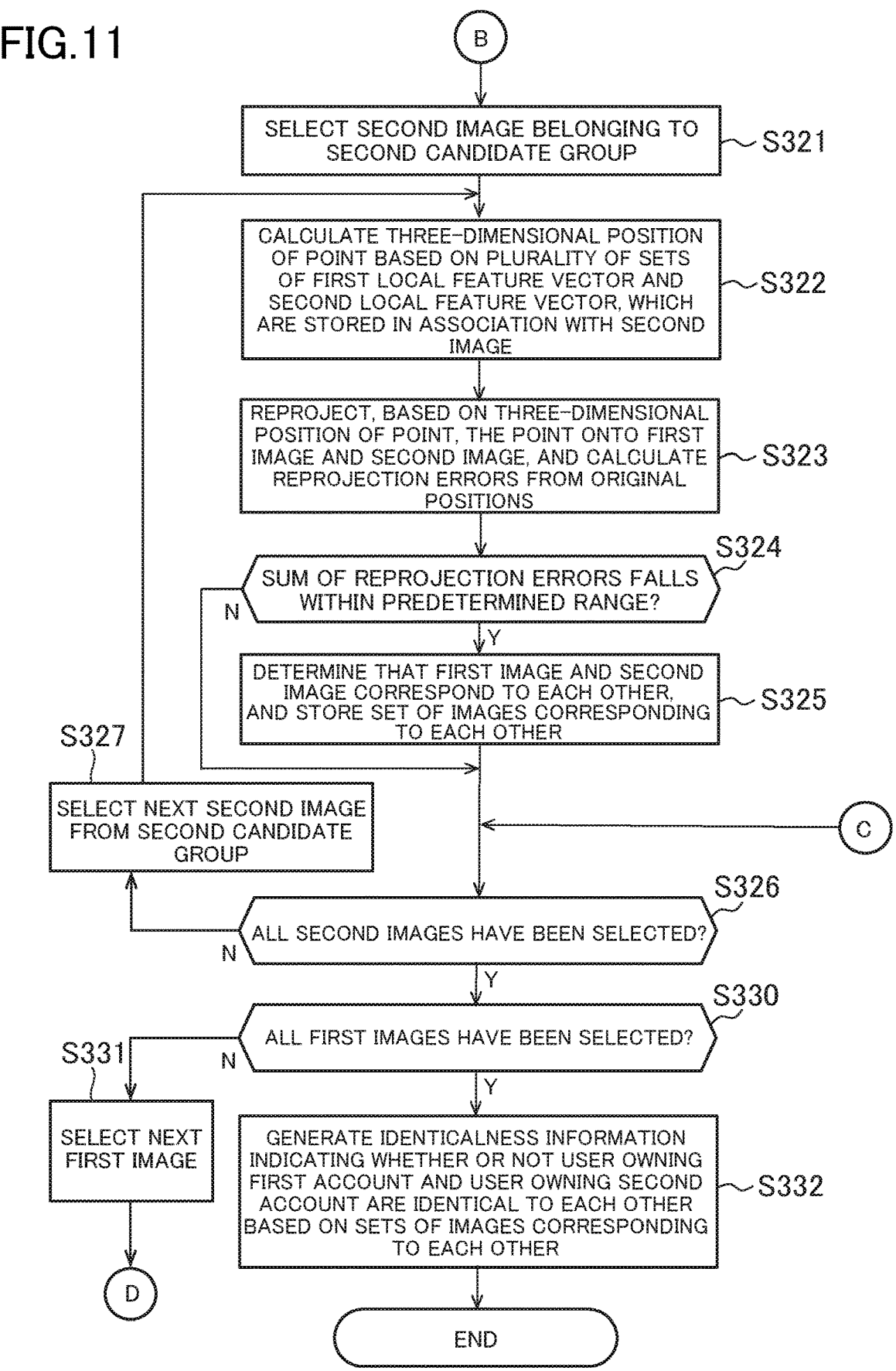
FIG. 11 is a flow chart for illustrating an example of the processing of the identicalness information output module.

FIG. 9 to FIG. 11 are flow charts for illustrating examples of processing of the identicalness information generation module 57. FIG. 9 to FIG. 11 indicate processing for identifying a set of a first image and a second image that have an identical background image from a plurality of first images associated with the first account and the second image associated with the second account, and determining whether or not the first account and the second account are owned by an identical user based on the identified set. The first-stage processing is the processing of Step S305, the second-stage processing is the processing from Step S311 to Step S317, and the third-stage processing is the processing from Step S321 to Step S327.

First, the identicalness information generation module 57 selects one first image from a plurality of images determined to have uniqueness among a plurality of first images associated with the first account (Step S301). Subsequently, the identicalness information generation module 57 acquires, as the first global feature vector, a global feature vector stored in association with the selected first image (Step S302), and acquires, as the plurality of first local feature vectors, a plurality of local feature vectors stored in association with the selected first image (Step S303).

Then, the identicalness information generation module 57 calculates, for each of the second images associated with the second account, the similarity between the first global feature vector and the second global feature vector associated with the second image. Of the plurality of second images, a second image having a similarity higher than a threshold value is added to the first candidate group (Step S305). The similarity is, for example, L2 norm, and a criterion of the similarity for determining an image which is similar thereto is set to be looser than that of the second-stage processing.

When the second image is added to the first candidate group, the identicalness information generation module 57 selects one second image belonging to the first candidate group (Step S311). Then, the identicalness information generation module 57 determines correspondences between the acquired plurality of first local feature vectors and the plurality of second local feature vectors associated with the selected second image (Step S312).

The publicly known matching method is used in determining the correspondences. For example, the identicalness information generation module 57 calculates a distance (corresponding to the similarity) between the first local feature vector and each of the plurality of second local feature vectors by, for example, L2 norm. In addition, when "d1<d2×A" (where A is a constant equal to or larger than 0 and smaller than 1) is satisfied between a second local feature vector having the smallest distance (d1) and a second local feature vector having the second smallest distance (d2), the identicalness information generation module 57 determines the second local feature vector having the smallest distance (d1) as the second local feature vector corresponding to the first local feature vector, and stores a set of the first local feature vector and the second local feature vector corresponding thereto in the storage 12. In this case, the determined second local feature vector is not to be determined to correspond to another first local feature vector. As the matching method, the matching between the first local feature vector and the second local feature vector may be performed by, for example, SuperGlue or another graph neural network.

Figure 12:
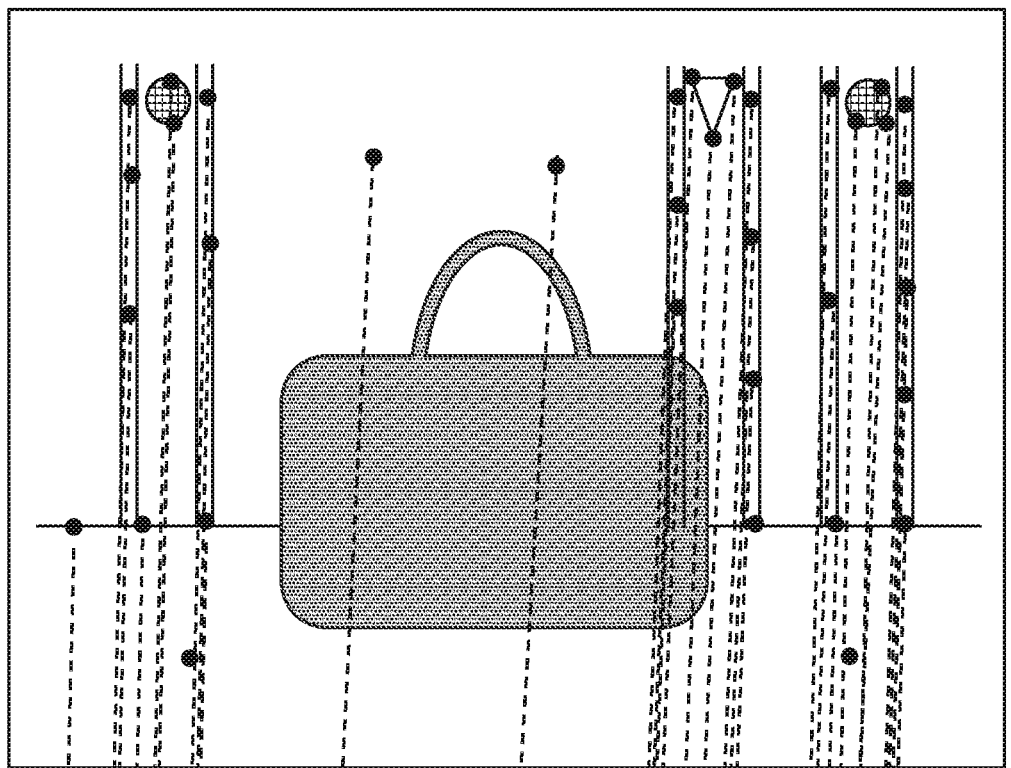
FIG. 12 is a view for illustrating correspondences between first and second local feature vectors.
Figure 12:
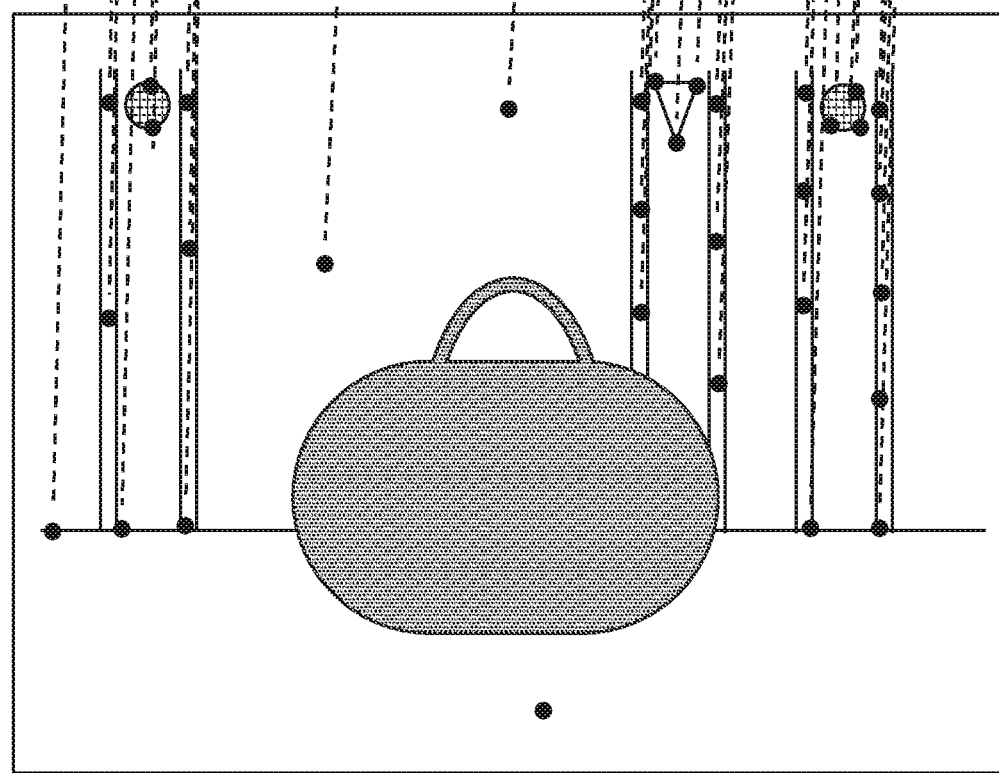

FIG. 12 is a view for illustrating the correspondences between the first and second local feature vectors. The upper image corresponds to one first image, and the lower image corresponds to one second image. The black circles of the upper image correspond to the first local feature vectors, and the black circles of the lower image correspond to the second local feature vectors. The black circles connected by each broken line indicate the first and second local feature vectors corresponding to each other.

When the correspondences are determined, the identicalness information generation module 57 determines whether or not the background image of the first image and the background image of the second image are similar to each other based on the correspondences (Step S313). Specifically, the identicalness information generation module 57 may determine the similitude based on whether or not the number of sets of the first local feature vector and the second local feature vector that are considered to correspond to each other exceeds a threshold value. The identicalness information generation module 57 may also determine the similitude based on whether or not a ratio of the number of sets to the smaller number between the number of first local feature vectors and the number of second local feature vectors exceeds a set threshold value.

When it is determined that the background image of the first image and the background image of the second image are not similar to each other (N in Step S313), the processing of Step S314 and Step S315 is skipped. Meanwhile, when it is determined that the background image of the first image and the background image of the second image are similar to each other (Y in Step S313), the identicalness information generation module 57 determines whether or not the background image of the first image and the background image of the second image are extremely close to each other (Step S314). More specifically, the identicalness information generation module 57 determines that the background image of the first image and the background image of the second image are extremely close to each other when the number of sets of the first and second local feature vectors corresponding to each other is larger than a strict threshold value and a sum or average of the distances between the first local feature vectors and the second local feature vectors corresponding to each other is smaller than a strict distance threshold value. In this case, the strict threshold value is larger than the set threshold value.

When it is determined that the background image of the first image and the background image of the second image are extremely close to each other (Y in Step S314), the identicalness information generation module 57 determines that the first image and the second image correspond to each other, and stores the set of the first image and the second image in the storage 12 (Step S319). Then, the identicalness information generation module 57 advances to the processing of Step S326 by skipping the third-stage processing.

When the backgrounds of the first image and the second image are extremely similar to each other, the identicalness information generation module 57 determines that the first image and the second image have an identical background without performing the subsequent processing. Thus, the subsequent processing is not performed, and hence the processing time is reduced. In addition, when the point of view of a camera is almost the same because of use of, for example, a tripod, it is possible to reduce such a fear that the relationship between the first account and the second account may be erroneously determined by erroneously determining that the first image and the second image do not correspond to each other in the third-stage processing.

Meanwhile, when it is not determined that the background image of the first image and the background image of the second image are extremely close to each other (N in Step S314), the identicalness information generation module 57 adds the selected second image to the second candidate group, and stores the sets of the first local feature vector and the second local feature vector corresponding to each other in the storage 12 in association with the second image (Step S315). When the second images belonging to the first candidate group include a second image that has not been selected (N in Step S316), the identicalness information generation module 57 selects the next second image from the first candidate group (Step S317), and repeatedly performs the processing of Step S312 and the subsequent steps.

When all of the second images belonging to the first candidate group have been selected (Y in Step S316), the second candidate group is determined, and the procedure advances to the third-stage processing of Step S321 and the subsequent steps.

When the second image is added to the second candidate group, the identicalness information generation module 57 selects one second image belonging to the second candidate group (Step S321). Then, the identicalness information generation module 57 calculates, based on the plurality of sets stored in association with the selected second image, a three-dimensional position of a point corresponding to each of the sets (Step S322). In other words, the identicalness information generation module 57 estimates the three-dimensional position of a point at which the first and second local feature vectors are extracted for each of the plurality of sets based on a position at which the first local feature vector has been extracted in the first image and a position at which the second local feature vector has been extracted in the second image.

Figure 13:
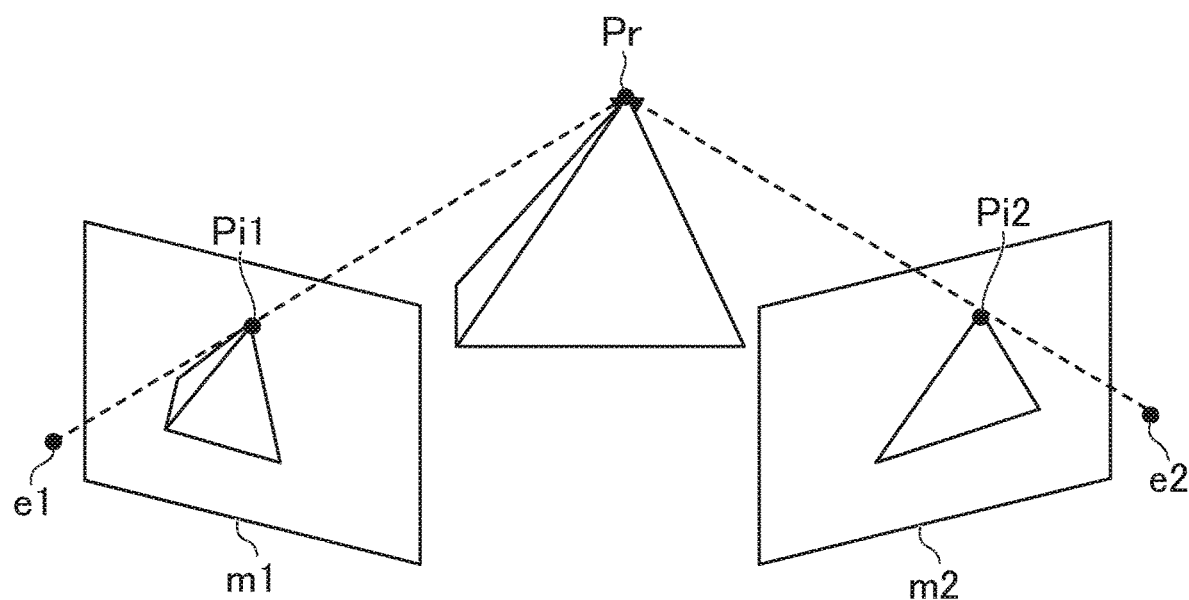
FIG. 13 is a view for illustrating calculation of a three-dimensional position.

The three-dimensional position may be estimated through use of a concept of so-called triangulation. FIG. 13 is a view for illustrating calculation of the three-dimensional position.

More specifically, first, the identicalness information generation module 57 estimates points e1 and e2 of view and photographing directions (see the arrows extending from the points e1 and e2 of view) with which the images have been acquired, based on positions (see points Pi1 and Pi2 of FIG. 13) in the first and second images (see images m1 and m2 of FIG. 13) from which the first and second local feature vectors included in each of the plurality of sets have been extracted. Then, the identicalness information generation module 57 uses a direct linear transform (DLT) method based on the points of view, the photographing directions, and the positions (points) at which the first and second local feature vectors have been extracted, to thereby obtain the three-dimensional position of a point (see point Pr of FIG. 13) corresponding to those points. A method of obtaining the three-dimensional position of a point at which local feature vectors corresponding to each other are extracted in a plurality of images is publicly known, and hence a more detailed description thereof is omitted. This method is also used in, for example, software for implementing an SfM, and the identicalness information generation module 57 may calculate the three-dimensional position of a point for each of the plurality of sets by executing this software.

When the three-dimensional position of the point is calculated, the identicalness information generation module 57 determines whether or not the three-dimensional position has been properly estimated. More specifically, first, the identicalness information generation module 57 reprojects the point onto the first image and the second image based on the calculated three-dimensional position of the point, and calculates reprojection errors between positions of the reprojected point and positions of original points in the first image and the second image (Step S323). In this case, the positions of the original points in the first and second images are the positions at which the first and second local feature vectors have been extracted in the first and second images, respectively. In other words, the reprojection errors are: a distance between a projected point at which the three-dimensional point has been projected onto the first image and the point at which the first local feature vector corresponding to the projected point has been extracted; and a distance between a projected point at which the three-dimensional point has been projected onto the second image and the point at which the second local feature vector corresponding to the projected point has been extracted.

The identicalness information generation module 57 calculates a sum of the reprojection errors calculated for each of the plurality of sets, and determines whether or not the sum of the reprojection errors falls within a predetermined range (is smaller than a determination threshold value) (Step S324). When the sum of the reprojection errors falls within the predetermined range (Y in Step S324), the identicalness information generation module 57 determines that the first image and the second image correspond to each other, and stores the set of the first image and the second image in the storage 12 (Step S325). When the sum of the reprojection errors does not fall within the predetermined range (is larger than the determination threshold value), Step S325 is skipped. In place of the determination based on whether or not the sum exceeds the threshold value, the determination may be performed based on the average or a variance of the reprojection errors.

When the second images belonging to the second candidate group include a second image that has not been selected (N in Step S326), the identicalness information generation module 57 selects the next second image from the second candidate group (Step S327), and repeatedly performs the processing of Step S322 and the subsequent steps. Meanwhile, when all of the second images belonging to the second candidate group have been selected (Y in Step S326), the third-stage processing is brought to an end, and the procedure advances to the processing of Step S330 and the subsequent steps.

In Step S330, the identicalness information generation module 57 determines whether all the images of at least one of first images that are associated with the first account and have uniqueness have been selected. When there is an image that has not yet been selected (N in Step S330), the identicalness information generation module 57 selects the next first image among the plurality of first images that are associated with the first account and have uniqueness (Step S331), and repeatedly performs the processing of Step S302 and the subsequent steps.

Meanwhile, when all the first images have been selected (Y in Step S330), the identicalness information generation module 57 generates identicalness information indicating whether or not the user owning the first account and the user owning the second account are identical to each other based on the sets of the first image and the second image that are stored in the storage 12 (Step S332). The plurality of sets each including the first image and the second image are information equivalent to at least one first image and at least one of second images corresponding to the at least one first image.

Figure 14:
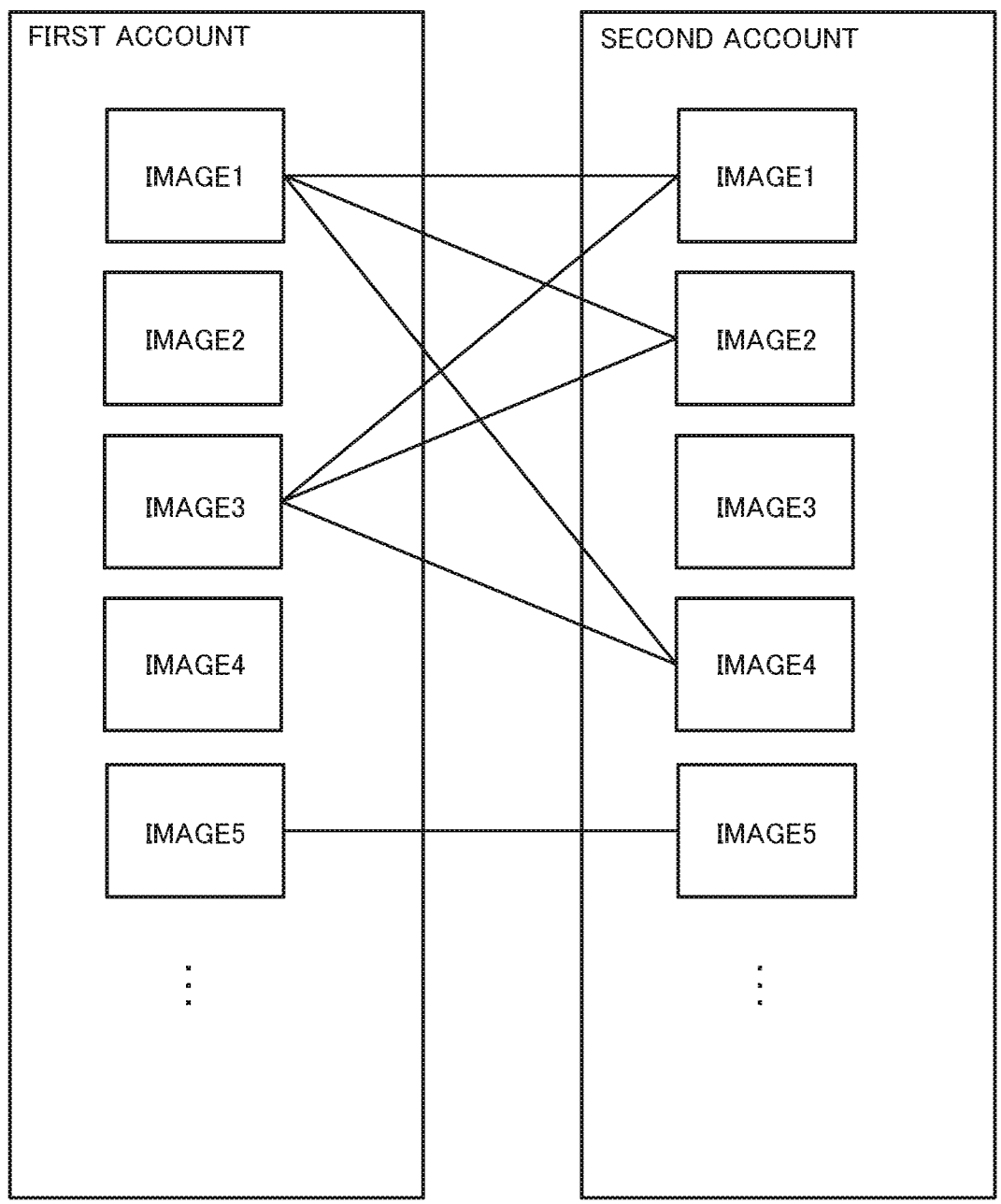
FIG. 14 is a diagram for illustrating an example of correspondences between first images and second images.

FIG. 14 is a diagram for illustrating an example of correspondences between the first images and the second images. FIG. 14 indicates combinations of images that have been considered to have the same background and determined to correspond to each other in the first account and the second account. The lines connecting the images indicate correspondences between the images. In Step S332, for example, when the number of sets or a value obtained by dividing the number of sets by the sum of the number of first images and second images exceeds a predetermined threshold value, the identicalness information generation module 57 determines that the first account and the second account are owned by an identical user, and may create identicalness information indicating the determination result. Through the determination using the correspondences of a plurality of images in such a manner, it is possible to prevent erroneous determination ascribable to, for example, an accidental match.

The processing illustrated in FIG. 9 to FIG. 11 is executed for a plurality of second accounts that are different from one another. In view of this, the identicalness information generation module 57 may generate identicalness information based on the number of second accounts determined to match the first account. More specifically, the identicalness information generation module 57 determines whether or not the first account and the second account match each other for each of the plurality of second accounts through use of the same method as the method of generating identicalness information indicating whether or not the two accounts are identical to each other in Step S332. Then, after the matching determination is performed for the plurality of second accounts in Step S332, the identicalness information generation module 57 generates identicalness information indicating whether or not the user owning the first account and users owning the plurality of second accounts are identical to each other based on the number of second accounts determined to match the first account.

For example, the identicalness information generation module 57 may generate identicalness information indicating that the user owning the first account and the users owning the plurality of second accounts are identical to each other when the number of second accounts matching the first account is smaller than an account threshold value (for example, an integer of 3 or more), and is not required to generate identicalness information indicating identicalness when the number of second accounts that match the first account is equal to or larger than the account threshold value. Thus, for example, when a background image actually having low uniqueness is targeted for the processing illustrated in FIG. 9 to FIG. 11, it is possible to prevent the first and second accounts actually owned by different users from being erroneously determined to be identical to each other.

When it is determined that the first image and the second image have the same background and correspond to each other, the identicalness information generation module 57 may determine, in place of Step S325 and Step S319, that an identical user owns the first account associated with the first image and the second account associated with the second image to generate identicalness information. In this case, the processing illustrated in FIG. 9 to FIG. 11 is not executed thereafter. With this processing, it is possible to reduce the processing load irrespective of some decrease in accuracy.

While there have been described what are at present considered to be certain embodiments of the invention, it will be understood that various modifications may be made thereto, and it is intended that the appended claims cover all such modifications as fall within the true spirit and scope of the invention.

What is claimed is:

1. An information processing device, comprising:
   at least one processor; and
   at least one memory device that stores a plurality of instructions which, when executed by the at least one processor, causes the at least one processor to:
      identify a background area of a first image registered from a first account and a background area of a second image registered from a second account; and
      output identicalness information indicating whether a user owning the first account and a user owning the second account are identical to each other based on the background area of the first image and the background area of the second image;
      acquire a plurality of first local feature vectors each indicating a local feature of the first image;
      acquire a plurality of second local feature vectors each indicating a local feature of the second image; and
      output the identicalness information based on results of searching for the second local feature vectors that correspond to the plurality of first local feature vectors, respectively;
      estimate a three-dimensional positions for each of a plurality of points, at which at least a part of the plurality of first local feature vectors are extracted, based on positions at which at least a part of the plurality of first local feature vectors have been extracted in the first image and positions at which the second local feature vectors corresponding to the plurality of first local feature vectors, respectively, have been extracted in the second image; and
      the outputting of the identicalness information is based on the estimated three-dimensional positions of the plurality of points.

2. The information processing device according to claim 1, wherein the plurality of instructions cause the at least one processor to:
   identify a background area of at least one first image and a background area of each of a plurality of second images;

search for at least one of second images corresponding to the at least one first image based on the background area of the at least one first image and the background areas of the plurality of second images; and output the identicalness information based on the at least one of second images corresponding to the at least one first image.

3. The information processing device according to claim 1, wherein the identicalness information comprises a result of determination of whether the user owning the first account and the user owning the second account are identical to each other.

4. The information processing device according to claim 1, wherein the identicalness information indicates a probability that the user owning the first account and the user owning the second account are identical to each other.

5. An information processing method, comprising:

identifying, with at least one processor operating with a memory device in a system, a background area of a first image registered from a first account and a background area of a second image registered from a second account; and outputting, with the at least one processor operating with the memory device in the system, identicalness information indicating whether a user owning the first account and a user owning the second account are identical to each other based on the background area of the first image and the background area of the second image;

acquiring a plurality of first local feature vectors each indicating a local feature of the first image;

acquiring a plurality of second local feature vectors each indicating a local feature of the second image; and outputting the identicalness information based on results of searching for the second local feature vectors that correspond to the plurality of first local feature vectors, respectively;

estimating a three-dimensional positions for each of a plurality of points, at which at least a part of the plurality of first local feature vectors are extracted, based on positions at which at least a part of the plurality of first local feature vectors have been extracted in the first image and positions at which the second local feature vectors corresponding to the plurality of first local feature vectors, respectively, have been extracted in the second image; and outputting the identicalness information based on the estimated three-dimensional positions of the plurality of points.

6. A non-transitory computer readable storage medium storing a plurality of instructions, wherein when executed by at least one processor, the plurality of instructions cause the at least one processor to:

identify a background area of a first image registered from a first account and a background area of a second image registered from a second account; and output identicalness information indicating whether a user owning the first account and a user owning the second account are identical to each other based on the background area of the first image and the background area of the second image;

acquire a plurality of first local feature vectors each indicating a local feature of the first image;

acquire a plurality of second local feature vectors each indicating a local feature of the second image; and output the identicalness information based on results of searching for the second local feature vectors that correspond to the plurality of first local feature vectors, respectively;

estimate a three-dimensional positions for each of a plurality of points, at which at least a part of the plurality of first local feature vectors are extracted, based on positions at which at least a part of the plurality of first local feature vectors have been extracted in the first image and positions at which the second local feature vectors corresponding to the plurality of first local feature vectors, respectively, have been extracted in the second image; and output the identicalness information based on the estimated three-dimensional positions of the plurality of points.

* * * * *